April 12, 1960     J. G. ATWOOD     2,932,743
RADIATION DETECTION SYSTEM
Filed Sept. 27, 1955     2 Sheets-Sheet 1

INVENTOR.
JOHN G. ATWOOD
BY
ATTORNEY

April 12, 1960 J. G. ATWOOD 2,932,743
RADIATION DETECTION SYSTEM
Filed Sept. 27, 1955 2 Sheets-Sheet 2

INVENTOR.
JOHN G. ATWOOD
BY
ATTORNEY

United States Patent Office 2,932,743
Patented Apr. 12, 1960

2,932,743

RADIATION DETECTION SYSTEM

John G. Atwood, Darien, Conn., assignor to The Perkin-Elmer Corporation, Norwalk, Conn., a corporation of New York Application September 27, 1955, Serial No. 536,943

8 Claims. (Cl. 250—83.3)

This invention is a unique radiation detection system and more particularly is concerned with the measurement of ratiation, such as infrared energy, for instance, by observing the amount of magnetic flux which is necessary to maintain a super-conducting bolometer at a predetermined point within its transition range.

One of the difficulties of measuring radiated energy is that the more conventional detectors, such as the thermocouples used to detect infrared energy, produce extremely minute electrical signals in response to the radiated energy impinging thereon. This condition, together with the fact that such detectors usually have a rather high noise figure, complicates the problem of accurately and reliably detecting radiated energy. Moreover, the time response of radiation detectors is often a limiting factor in design considerations.

The present invention contemplates use of a bolometer maintained at a low temperature so as to render it superconducting. In this conduction, and particularly within the bolometer's transition range, a high rate of change of resistance occurs for small temperature changes, such as may be caused by infrared radiation impinging thereon, for instance. Magnetic means is positioned in flux linkage relation with the bolometer in accordance with the teaching of the present invention, and the magnetic flux is regulated to maintain the bolometer within its transition range. The variation in magnetic flux which is necessary to maintain the bolometer at a selected operative point within the transition range is therefore a measure of the radiated energy impinging upon the bolometer. As will be appreciated by those skilled in the art, the variation of the magnetic flux or the electrical current which produces such flux is considerably more susceptible to accurate and precise measurement by a number of known and relatively conventional means, than is the translation of radiant energy directly into electrical signals by a thermocouple or comparable means.

The object of the present invention is therefore the accurate and precise measurement of radiated energy.

A coextensive object of the present invention is to render radiated energy more readily and accurately measurable by a system which correlates magnetic energy to the radiated energy.

A further object of the present invention is to accurately measure the change in resistance of a bolometer due to radiated energy impinging thereon regardless of ambient temperature changes and drift.

The concept and operation of the present invention may be better understood from the following detailed description of several embodiments of the present invention, together with the accompanying drawings, in which, Fig. 1 is a graphic illustration of the threshold characteristics of the flux-temperature resistance transition range of a number of metals known to be superconducting;

It has been known for a considerable time that the electrical resistance of a number of metals abruptly decreases at a temperature approaching absolute zero. It has been established that the resistivity of a superconductor is barely finite, being of less than the order of $10^{-20}$ ohms per centimeter when such a conductor is in a superconducting state. In its superconducting state, such a metal will therefore offer virtually no electrical resistance. At least twenty-one metallic elements are known to be superconductors and there are numerous alloys and intermetallic compounds which also exhibit the superconducting phenomenon.

Figure 1:
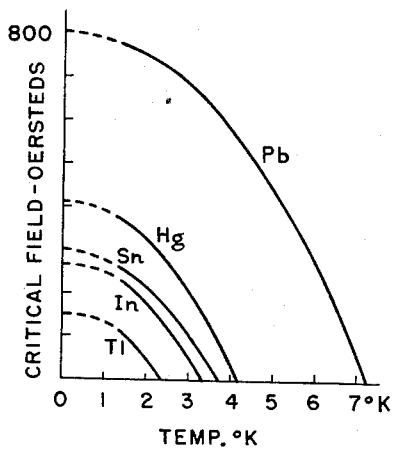

It has also been appreciated for a considerable time that the superconducting property of a material will be destroyed if the superconductor is subjected to a sufficiently strong magnetic field. It was originally thought that such disturbance of superconductivity by a magnetic field was an irreversible phenomenon, but subsequent discovery proved that when such a dominant magnetic field is removed, or sufficiently decreased, superconductivity is restored. The magnitude or density of the critical or threshold magnetic field increases as the temperature is lowered and the relationship has an approximately parabolic temperature dependence. It is apparent that typical threshold field graphs for superconducting metals, several of which are illustrated in Fig. 1, are analogous to the vapor-pressure-temperature curve for a liquid.

For temperatures and magnetic fields corresponding to points under the threshold curves superconduction takes place, while for higher temperatures and more intense magnetic fields, the normal resistivity or non-superconduction of the metal prevails. If the temperature of such a material can be maintained at the point where it is approximately midway between its normal resistance state and its superconducting state, small temperature changes within the transition region will produce extremely high rate of change of resistance of the superconductor, i.e., the slope of the temperature-resistance is at a maximum, and substantially linear through a considerable amount of resistance change.

During recent years, several bolometers making use of this property have been developed. One, namely, that of columbium nitride (CbN) has a transition temperature range at approximately 15° K., which falls just slightly below the triple point of hydrogen and makes the practical use of such a bolometer readily realizable with conventional cooling equipment. Such a bolometer is described in the Journal of the Optical Society, volume 31, No. 10, October 1948, at page 854.

Figure 2:
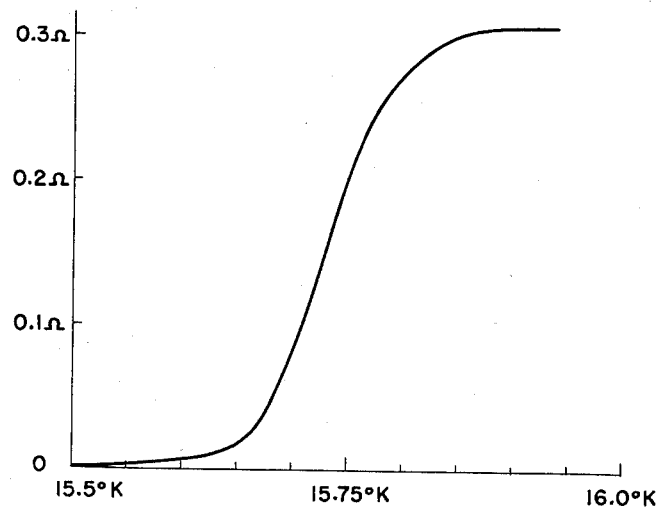
Fig. 2 is a graphic illustration of the temperature vs. resistance variation of a typical superconducting bolometer.

Fig. 2 is a graphic illustration of the transition curve for a CbN bolometer, and it will be observed that within the transition range of the bolometer there is a relatively very large change in its resistance for an extremely small change in its temperature. The article referred to above also discloses a type of cryostat which may be employed to cool the bolometer to a superconducting state through the use of liquid hydrogen. This particular cryostat need not be used however, since liquid helium is commercially available in practical quantities and may be used in the stead of liquid hydrogen to eliminate the hazard of explosion in such environments where that danger may be imminent.

In accordance with the concept of the present invention, a superconducting bolometer is maintained at substantially a midway point of the transition range of its superconduction by the coaction of both cooling means and a variable magnetic flux source positioned in flux linkage relationship with the bolometer.

Figure 3:
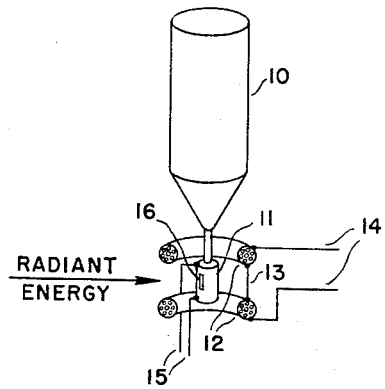
Fig. 3 is an illustration of a component assembly which may be used in accordance with the present invention comprising a superconducting bolometer cooled by a cryostat and positioned in magnetic flux linkage with a Helmholtz coil arrangement.

Fig. 3 illustrates schematically an assembly comprised of a cryostat 10 and a bolometer 11, which may be positioned so that the bolometer 11 is in magnetic flux linkage with a pair of Helmholtz coils 12. The Helmholtz coils 12 are interconnected by a connection 13 and arranged to be connected through a pair of leads 14 to a controllable electrical source. The coils 12 are shown in cross section to illustrate the position of the bolometer 11 in flux linkage with the magnetic flux produced by the coils. The bolometer 11 is positioned to receive radiated energy through a window 16 and is connectable through leads 15 to appropriate circuitry for detecting changes in its resistance.

Figure 4:
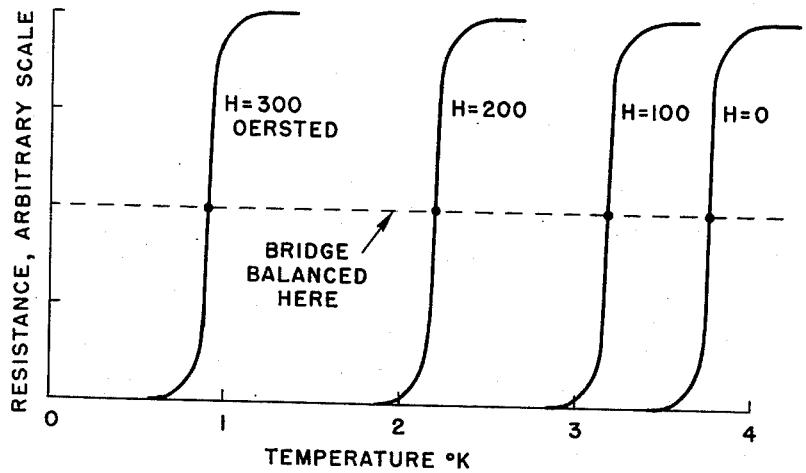
Fig. 4 is a graphic illustration of the transition range characteristics of a superconducting metal for several values of magnetic flux density.

Assuming that a superconducting bolometer is cooled by a cryostat or other means to a temperature well within its normal superconducting range, a magnetic field of appropriate strength will bring the bolometer to a midway point of its transition range. As illustrated in Fig. 4, if a bolometer comprised of the metal lead (Pb) is cooled to approximately 3° K., a magnetic field of 100 oersteds will bring the bolometer to a midpoint between normal conduction and superconduction. As may be seen by reference to the ordinate of the graph of Fig. 4 within this range, a radical change in the resistance of the bolometer from virtually zero to its normal resistance takes place in response to a small temperature change of the bolometer if the magnetic field is unchanged. More intense magnetic fields require cooling of the bolometer to lower temperatures to bring the bolometer within the transition range of its superconduction. As illustrated in Fig. 4, these relationships may be represented by a family of characteristic curves for each type of superconducting bolometer.

In accordance with the concept of the present invention, the change in resistance of the bolometer is employed to regulate the magnetic field so as to maintain the bolometer in an operative condition substantially at the midpoint of its transition range. The present invention therefore contemplate a closed loop system in which the change in magnetic field necessary to regulate the operation of the bolometer at a predetermined point of its transition characteristic is indicative of its temperature.

Figure 5:
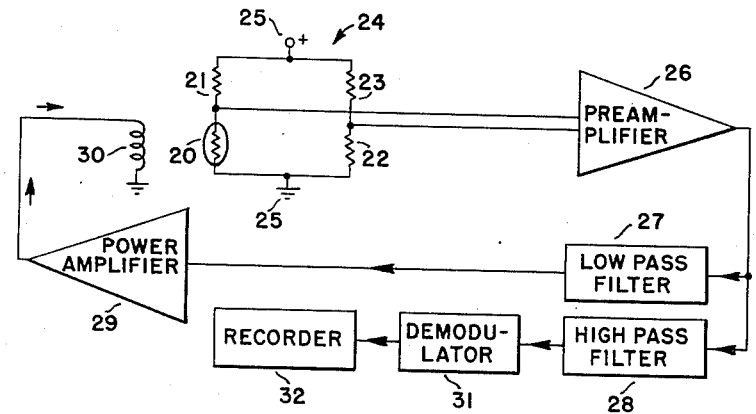
Fig. 5 is a schematic representation of an embodiment of the present invention.

As illustrated in Fig. 5, an embodiment of the present invention may comprise a bolometer 20 operatively connected with an electrical circuit by means of which the changes in resistance of the bolometer may be detected. The particular embodiment shown in Fig. 5 shows the bolometer 20 connected as one arm of a symmetrically balanced four-arm resistance bridge circuit 24. In addition to the bolometer 20, the bridge circuit 24 consists of resistance elements 21, 22 and 23 having equal electrical values. An electrical potential is impressed across the bridge 24 at two symmetrical points 25. The bolometer 20 is positioned so as to receive radiated energy which may be in the form of chopped infrared energy, for instance, and the change in temperature of the bolometer resulting from the chopped infrared radiation impinging thereon causes a change in its resistance and a correlated change of the potential developed across the bolometer arm 20 of the bridge circuit 24. The potential developed across the bolometer 20, when out of balance with that developed across the other arms of the bridge, produces a net potential across two symmetrical points of the bridge 24 which is fed to a preamplifier 26.

The output of preamplifier 26 is connected to two filter networks, one of which 27 is a low-pass filter, and the other 28 a high-pass filter. The low-pass filter 27 passes only those relatively slow-changing signals which are due to slowly varying changes in the potential developed by the bolometer 20 resulting, for instance, from drift or such factors as gradual changes in ambient temperature. Such slowly varying changes in signal as are passed by the low-pass filter 27 are fed to a power amplifier 29, the output of which is in turn connected to the magnetic flux means 30 positioned in flux linkage relationship with the bolometer 20. A closed servomechanism loop is therefore completed from the bolometer arm of the balanced bridge 24 through the preamplifier 26, the low-pass filter 27, and the power amplifier 29 to produce self-correcting amounts of magnetic flux which act upon the bolometer 20 so as to maintain it at a substantially midway point of its flux-temperature-resistance transition range. It should be appreciated that the present invention is so conceived and executed that this automatic self-correcting mode of operation is maintained regardless of the ambient conditions under which the system operates, within reasonable limits.

The high-pass filter 28 also receives the signal output of the preamplifier 26 and rejects all frequencies except a narrow band of frequencies in the region of that frequency at which the intermittent infrared energy impinging upon the bolometer 20 is chopped. Therefore, substantially only those signals due to changes in resistance of the superconducting bolometer 20 occurring at the chopping frequency reach a demodulator 31 which is connected to receive the output of the high-pass filter 28. The demodulator 31 performs the functions of accurately detecting such fluctuation and producing a signal proportional thereto. If radiation of two different levels of intensity alternately fall upon the bolometer, the amplitude of the demodulated signal will be indicative of the difference between the two radiation levels and the phase will be indicative of which level of radiation is greater. A recorder 32, connected to the output of the demodulator 31, is provided for preserving a record of such signals as are produced by intermittent energy impinging upon the superconducting bolometer 20. The recorder 32 may be arranged to record such signals against any desired related variable.

Figure 6:
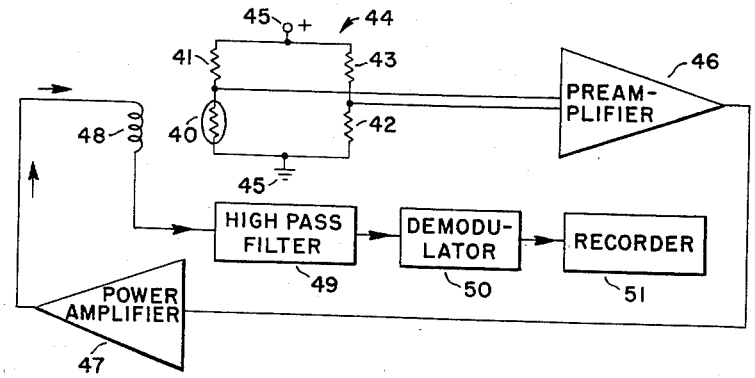
Fig. 6 is a schematic representation of another embodiment of the present invention.

Fig. 6 schematically illustrates another embodiment of the present invention wherein a superconducting bolometer 40 is connected in an arm of a balanced bridge circuit 24 and arranged to receive radiant energy which is preferably intermittent or alternating between two levels at a known or determinable frequency. The other resistance elements 41, 42 and 43 of the bridge 44 have equal electrical values and an electrical potential is impressed across two symmetrical points 45 of the balanced bridge 44. In a manner similar to the system illustrated in Fig. 5, a change of resistance of the bolometer 40 develops a potential across the bridge 44 which is fed to a preamplifier 46. From this point on, the operation of the embodiment of Fig. 6 differs from that of the embodiment illustrated in Fig. 5. The electrical potentials developed across the bridge 44 because of changes in resistance of the superconducting bolometer 40 are fed directly to a power amplifier 47. The power amplifier 47 supplies electrical current to a magnetic flux-producing means such as the coil 48 as a function of the input which it receives. The system is designed and arranged so that the amount of such current is thus automatically regulated to maintain the superconducting bolometer 40 at a point substantially midway in its flux-temperature-resistance transition range. The electrical current which flows through the magnetic flux means 48 is fed to a high-pass filter 49 which rejects all frequencies except a narrow band of frequencies approximating the frequency at which the radiated energy is chopped. The electrical currents passed by the high-pass filter 49 are in turn fed to a demodulator 50 which detects the electrical signals of chopping frequency and produces an output signal proportional to the amplitude of such detected signals. The demodulator output is in turn fed to a recorder where a permanent record may be made of the instantaneous amplitude of the radiated energy impinging upon the superconducting bolometer 40, against time for instance, or any other variable of related significance.

It should be noted that the embodiment of Fig. 6, like the system of Fig. 5, includes a closed servomechanism loop. The closed loop system of the embodiment of Fig. 6 is completed from the bolometer 40 through the preamplifier 46, the power amplifier 47, and the magnetic flux means 48 which controls and acts upon the superconducting bolometer 40 so as to constantly maintain it at the midway point of its flux-temperature-resistance transition range. The embodiment of Fig. 6 differs in its arrangement from that of Fig. 5 in that the embodiment of Fig. 6 employs both slow and rapid changes in resistance of the superconducting bolometer to create correlated changes in the amounts of magnetic flux linking the bolometer. The detected signals of the latter system do not however reflect changes in resistance of the superconducting bolometer due to changes in ambient conditions because only the relatively rapid changes in the chopping frequency are detected as the recordable signal indicating the instantaneous intensity of the radiation impinging upon the superconducting bolometer.

The embodiments of the present invention illustrated in the drawings have been explained in operative terms of receiving and detecting infrared radiation for illustrative purposes. It will be apparent to those skilled in the art, however, that any change of temperature induced in a bolometer element may be detected by the system of the present invention. Radio frequency energy is one example of radiant energy which may induce temperature changes in a bolometer type element having superconducting properties and is therefore susceptible to precise measurement in accordance with the teaching and spirit of my invention.

Some of the more important advantages and features of the present invention are that extremely minute changes in temperature are translated to readily measurable changes in magnetic flux and the system is so conceived that ambient changes in temperature are automatically cancelled out. When electromagnetic flux-producing means are employed, the changes in electrical current flowing through such electromagnetic means may be readily correlated to the radiant energy changes and as will be appreciated by those skilled in the art, the measurement of such current which is used to counter the effect of a change in temperature in accordance with the teaching of the present invention is much more easily and precisely accomplished than the measurement of electrical signals produced by directly transducing the changes in radiant energy. Moreover, such current measurement does not include the noise of transducing elements such as thermocouples.

In accordance with variant embodiments of the system of the present invention, a superconducting bolometer is rendered insensitive to ambient changes in temperature as well as variations in a balanced bridge circuit of which the bolometer is a part, so that the detected changes in the potential developed across the bolometer are caused only by the intermittent radiant energy of a determinable frequency impinging upon the bolometer.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An infrared radiation detection system comprising a bolometer positioned to receive said radiation, means for regulating the temperature of said bolometer to permit superconduction therein, variable magnetic means positioned in flux linkage relation with said bolometer, and magnetic flux control means responsive to the current flow through said bolometer to maintain said bolometer within its flux-temperature-resistance transition range.

2. Apparatus for detecting the difference between two levels of intermittent infrared radiant energy comprising a bolometer positioned to receive said radiant energy, means for controlling the temperature of said bolometer to permit superconduction therein, variable magnetic means positioned in flux linkage relation with said bolometer, and means for controlling the variation of said magnetic flux to maintain said bolometer at a predetermined point of its flux-temperature-resistance transition range, means for measuring the amplitude of intermittent variation in said magnetic flux as a measure of the difference in intensity between said two levels of radiant energy.

3. An infrared radiation detection system comprising a bolometer positioned to receive said radiation, means for regulating the temperature of said bolometer to permit superconduction therein, variable magnetic means positioned in flux linkage relation with said bolometer, electrical means responsive to the changes in resistance of said bolometer for varying the magnetic flux intensity to maintain said bolometer at a predetermined point of its flux-temperature-resistance transition range, and means for measuring at least a portion of the electrical current through said bolometer means as a measurement of the radiation intensity impinging upon said bolometer.

4. An infrared radiation detection system comprising a bolometer positioned to receive said radiation, means for regulating the temperature of said bolometer to permit superconduction therein, electromagnetic means positioned in magnetic flux linkage relation with said bolometer, an electric power source connected to supply said electromagnetic means, whereby to maintain said bolometer at a predetermined point of its flux-temperature-resistance transition range, means to measure the variations in electrical current through said magnetic means as a measure of the changes of intensity of said radiation impinging upon said bolometer.

5. Apparatus for detecting the difference between two levels of intermittent infrared radiant energy comprising a bolometer positioned to receive said radiant energy, means for regulating the temperature of said bolometer to permit superconduction therein, variable magnetic means positioned in flux linkage relation with said bolometer, means responsive to the changes in resistance of said bolometer for producing a signal proportional thereto, means responsive to changes in the amplitude of said signal, other than intermittent changes, for varying said magnetic flux to maintain said bolometer at a predetermined point of its flux-temperature-resistance transition range, and means for detecting the amplitude of intermittent changes in said signal as a measure of the difference in intensity of said two levels of radiant energy.

6. Apparatus for detecting the difference between two levels of intermittent infrared radiant energy comprising a bolometer positioned to receive said radiant energy, means for regulating the temperature of said bolometer to permit superconduction therein, variable magnetic means positioned in flux linkage relation with said bolometer, a balanced bridge circuit having said bolometer connected as one of its arms, a source of potential impressed across said bridge, means responsive to unbalance of said bridge circuit for producing a signal proportional thereto, means responsive to changes in the amplitude of said signal, other than intermittent changes, for varying said magnetic flux to maintain said bolometer at a predetermined point of its flux-temperature-resistance transition range, and means for detecting the amplitude of changes in said signal at an intermittent frequency as a measure of the difference in intensity of said two levels of radiant energy.

7. Apparatus for detecting the difference between two levels of intermittent infrared radiant energy alternating at a determinable frequency comprising a bolometer positioned to receive said radiant energy, means for regulating the temperature of said bolometer within its superconducting range, variable magnetic means positioned in flux linkage relation with said bolometer, a bridge circuit including said bolometer connected as one of its arms, a source of potential impressed across said bridge, means responsive to unbalance of said bridge for producing a signal proportional thereto, means responsive to changes in the amplitude of said signal, other than changes at said intermittent frequency, for varying said magnetic flux to maintain said bolometer at a predetermined point of its flux-temperature-resistance transition range, and means for detecting the amplitude of changes in said signal at said intermittent frequency as a measure of the difference in intensity of said two levels of radiant energy.

8. Apparatus for detecting the difference between two levels of intermittent infrared radiant energy alternating at a determinable frequency comprising a bolometer positioned to receive said radiant energy, means for regulating the temperature of said bolometer within its superconducting range, electromagnetic means connected to a source of electrical current and positioned in flux linkage relation with said bolometer, means responsive to the changes in resistance of said bolometer for controlling the amount of current supplied to said electromagnetic means and maintaining said bolometer at a predetermined point of its flux-temperature-resistance transition range, and means for detecting the amplitude of intermittent changes in said current at said determinable frequency as a measure of the difference in intensity of said two levels of radiant energy.

References Cited in the file of this patent

UNITED STATES PATENTS

| | | |
|---|---|---|
| 2,189,122 | Andrews | Feb. 6, 1940 |
| 2,645,126 | Hornfeck | July 14, 1953 |
| 2,671,154 | Burstein | Mar. 2, 1954 |

OTHER REFERENCES

Review of Scientific Instruments, July 1942, by Andrews et al., pages 281 to 292.